Sept. 27, 1955 P. BRAZEAU 2,718,730
GOLF GREEN DRAG
Filed Aug. 2, 1952 2 Sheets-Sheet 1
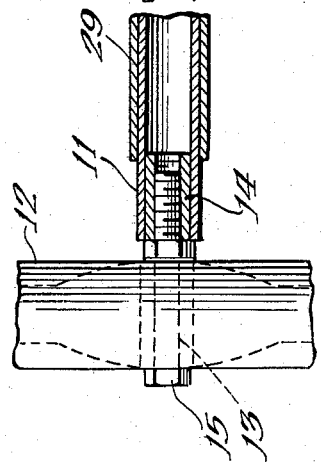
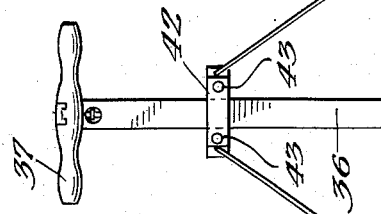
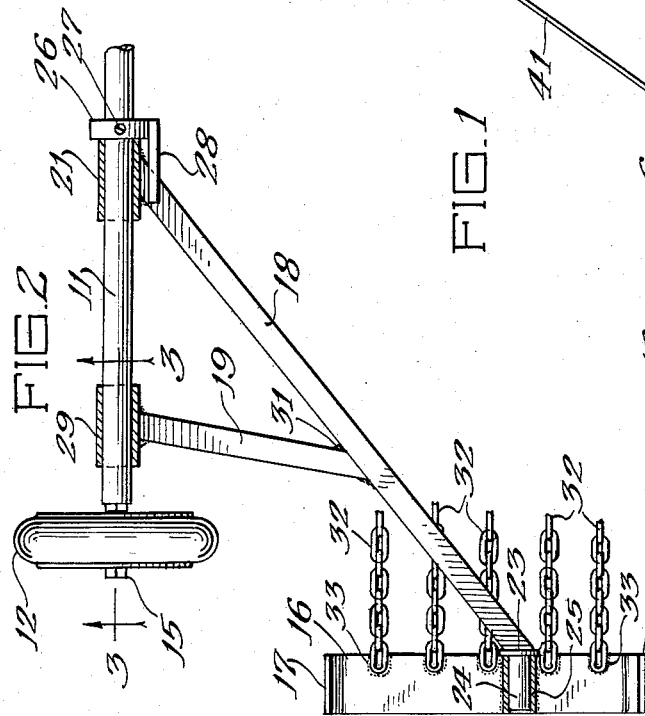
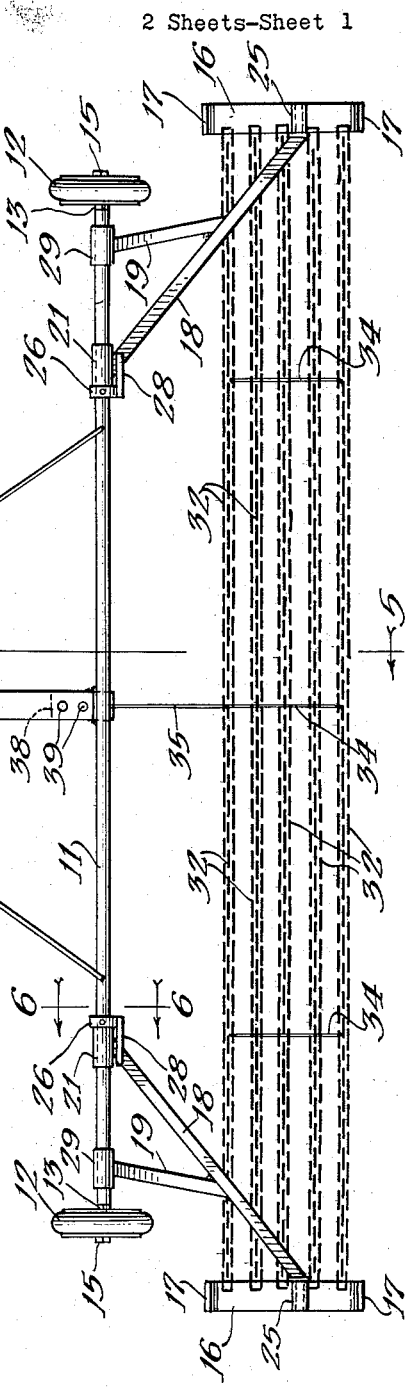
INVENTOR.
Pierre Brazeau
BY
Attorney Sept. 27, 1955 P. BRAZEAU 2,718,730
GOLF GREEN DRAG
Filed Aug. 2, 1952 2 Sheets-Sheet 2
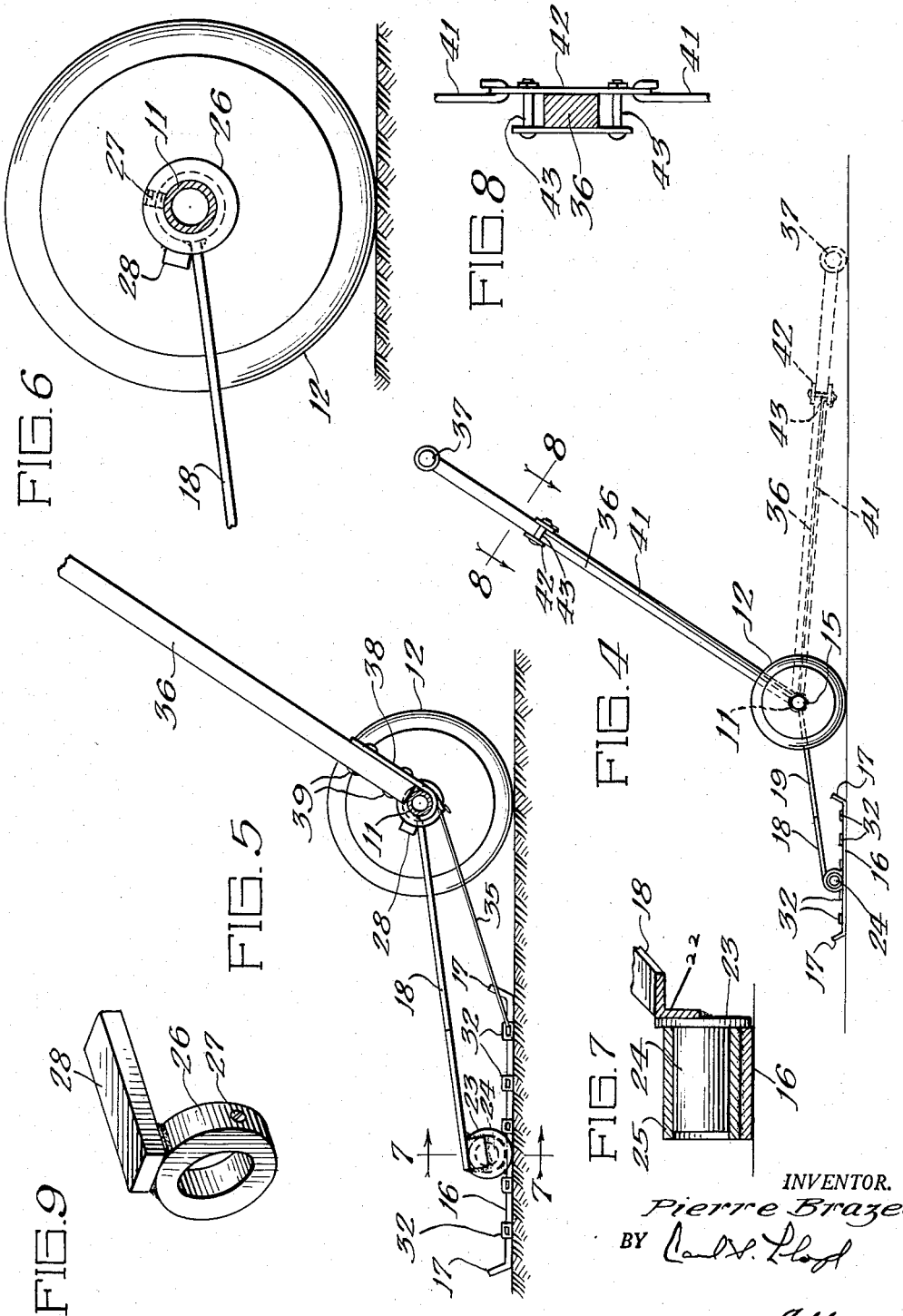
INVENTOR.
Pierre Brazeau
BY
Attorney

United States Patent Office 2,718,730
Patented Sept. 27, 1955

2,718,730

GOLF GREEN DRAG

Pierre Brazeau, Chicago, Ill.

Application August 2, 1952, Serial No. 302,440

6 Claims. (Cl. 47—1)

This invention relates to an apparatus for dragging or sweeping golf greens or the like to remove dew or other moisture, as well as fungus growth, leaves, twigs and other matter so as to condition the greens or like surfaces for play. The apparatus is particularly useful for sweeping greens on golf courses, but may also be used for cleaning and evening other surfaces such as bowling greens, bent grass lawns or the like.

As is well known, it is often necessary to sweep golf greens to remove dew and other matter therefrom in the early morning before golf play begins. This is ordinarily done by hand by means of a flexible bamboo pole or other form of hand sweeper. Sweeping the greens in this manner is slow and requires particular skill and care to obtain uniform surface conditions and thorough removal of moisture and other foreign matter.

The primary object of my invention is to provide an apparatus whereby the sweeping may be performed much more quickly and thoroughly than has hitherto been possible and which does not require particular skill or special care in use in order to obtain uniform and satisfactory results.

A more particular object is to provide for this purpose a vehicular drag which need only be run over the green or other surface to be cleared to thoroughly remove dew and other extraneous matter in a minimum of time.

A highly important advantage of the device is that it breaks up the mycelium or fungus growth which forms on greens and causes "brown patch" and other damage. It has been found that by the regular use of this apparatus such damage is greatly ameliorated and often practically eliminated.

Another object is to provide an apparatus for this purpose which is light in weight and easily handled on the greens as well as transported from green to green.

Other objects and advantages of the invention will be apparent from the following description, which, taken in connection with the accompanying drawings, discloses a preferred but only an illustrative embodiment thereof.

Referring more particularly to the drawings:

Fig. 1 is a top plan view, partly diagrammatic, of a green sweeping apparatus in which my invention is embodied;

Fig. 2 is a detailed and partially sectionalized view of the part of the apparatus in the lower left-hand corner of Fig. 1;

Fig. 3 is a fragmentary and sectional view taken substantially along the line 3—3 in Fig. 2;

Fig. 4 is a side elevational view of the apparatus with the handle shown in full lines in the raised or operative position and in dotted lines in the lowered position resting on the ground;

Fig. 5 is a view, partially in section and partially in elevation, taken substantially along the line 5—5 in Fig. 1, showing one of the wheels and one of the runners of the chain drag on the ground;

Fig. 6 is an enlarged sectional and elevational view taken substantially on the line 6—6 in Fig. 1;

Fig. 7 is a sectional view showing the attachment of one of the brackets or braces to one of the runners, being taken substantially on the section line 7—7 in Fig. 5;

Fig. 8 is a detailed view taken substantially on the line 8—8 in Fig. 4; and

Fig. 9 is a perspective view of an adjustable collar and associated member by which the runners and chains will be held at a proper angle with all the bottom area of the runners in contact with the ground, even though the handle be raised to a position which would otherwise cause the runners to tilt.

The apparatus, as thus illustrated, includes a cross shaft 11 on the ends of which rubber-tired wheels 12 are mounted by means of axles 13 and axle plugs 14, the wheels being held in place on the axles by suitable nuts 15.

Runners 16 having upturned ends 17 (best shown in Fig. 5) are connected with the cross shaft 11 by means of brackets 18 and 19. The brackets 18 are rigidly secured at their upper ends to sleeves 21 mounted on the cross shaft 11 and at their lower ends are rigidly connected, as by welding of bent portions 22, with washers 23 mounted on runner pins 24, which extend through bushings 25 provided on the upper side of the runners 16.

Mounted on the cross shaft 11, adjacent the sleeves 21, are collars 26, which are adapted to be secured to the shaft 11 in desired position of adjustment by means of set screws 27. Arms 28 are rigidly secured, as by welding, to the collars 26 and bear upon the brackets 18 as shown in Figs. 1 and 2, for example, so as to hold the runners down to the ground throughout their length even though the handle (to be later described) be elevated to an extraordinary height, as when used by a very tall operator.

The brackets or braces 19 are secured to the cross shaft 11 by means of sleeves 29 and are rigidly attached to the brackets 18 at a position between the ends thereof, as by welding indicated at 31.

Chains 32, shown diagrammatically in Fig. 1 and partially in Fig. 2, extend between the runners 16, there being five of such chains shown in the drawings, with the end links thereof secured to the runners as by welding (as indicated at 33 in Fig. 2). Wire spacers 34 are provided at suitable intervals along the chains to keep them properly spaced from each other and a wire connection 35 is provided between the innermost chain and the cross shaft 11, as shown in Figs. 1 and 5.

A handle member 36, with a hand piece 37 at the outer end thereof, is secured to the cross shaft 11 by means of a handle bracket 38 secured, as by welding, to the cross shaft 11 and attached to the handle member 36 by means of bolts 39. The handle member is, or may be, further braced and secured to the shaft 11 by means of links or guy wires 41 attached at one end to said cross shaft and connected at the other end to a clevis 42 clamped to the handle member 36 by means of bolts 43. The handle may be raised and lowered within limits, as shown in Fig. 1, without effect upon the runners but if raised above a predetermined height it would tend to tilt the runners except for the action of the arms 28 on the bracket 18.

It will now be evident that to sweep or drag the green or other surface to be cleaned of moisture or other matter the attendant need merely pull or push the apparatus over the green, assuming that a proper adjustment has been obtained as between the runners and chains on the one hand and the handle on the other by setting the collars 26 in suitable position. No special skill is required and the job may be quickly done with through and uniform results without the exercise of special care. The swath covered by the apparatus of course may be varied as desired by the spacing of the runners 16 in the construction of the apparatus; also two or more of the devices could be connected together if desired and arranged to be operated from one handle, thus increasing the width of the swath covered by one traversing of the green. Of course the number and weight of the chains or other flexible sweeping elements (if elements other than chains are employed, as conceivably they might be) may be selected by the manufacturer to suit the particular conditions of use of machines of different sizes and constructions. The flexibility of the chains or like sweeping or dragging elements, and the weight thereof, causes them to cling closely to the grass or other surface to effect thorough and uniform coverage of all parts thereof.

The foregoing detailed description has been given for clearness of understanding only and no unnecessary limitations should be understood therefrom, but the appended claims should be construed as broadly as permissible in view of the prior art.

I claim:

1. A vehicular drag apparatus for golf greens or the like, comprising a frame, including a cross shaft, supporting wheels carried by said shaft, a pair of runners, brackets extending between said frame and said runners and providing a pivotal connection therebetween, with said runners arranged to slide flat upon the ground, one or more chains having non-scarifying bottom surfaces and extending between said runners and adapted to drag upon the grass when the apparatus is propelled over the green, and a manually manipulatable handle connected with the frame and movable up and down relative to said runners without disturbing the flat position of the latter whereby the apparatus may be so propelled over the green.

2. A vehicular drag apparatus for golf greens or the like, comprising a frame, including a cross shaft, supporting wheels carried by said shaft, a pair of runners, brackets extending between said frame and said runners and providing a pivotal connection therebetween, with said runners arranged to slide flat upon the ground, the ends of said runners being upturned, one or more chains having non-scarifying bottom surfaces and extending between said runners and adapted to drag upon the grass when the apparatus is propelled over the green, and a manually manipulatable handle connected with said frame and movable up and down relative to said runners without disturbing the flat position of the latter whereby the apparatus may be so propelled over the green.

3. A vehicular drag apparatus for golf greens or the like, comprising a frame, including a cross shaft, supporting wheels carried by said shaft, a pair of runners, brackets extending between said frame and said runners and providing a pivotal connection therebetween, with said runners arranged to slide flat upon the ground, a plurality of chains having non-scarifying bottom surfaces and extending between said runners and adapted to drag upon the grass when the apparatus is propelled over the green, spacers connecting said chains and adapted to keep the same in spaced relationship, and a manually manipulatable handle connected with said frame and movable up and down relative to said runners without disturbing the flat position of the latter whereby the apparatus may be propelled over the green.

4. A vehicular drag apparatus for golf greens or the like, comprising a frame, including a cross shaft, supporting wheels carried by said shaft, a pair of runners arranged to slide flat upon the ground, brackets connecting said runners with said cross shaft, a plurality of chains having non-scarifying bottom surfaces and extending between said runners and adapted to drag upon the grass when the apparatus is propelled over the green, a handle connected with said cross shaft whereby the apparatus may be so propelled over the green, and adjustable means on said cross shaft including a member movable with said handle and engageable with and adapted to act upon said brackets when the manually manipulatable handle is raised above a predetermined height to maintain the runners and chains in contact with the green.

5. A vehicular drag apparatus for golf greens or the like, comprising a frame, including a cross shaft, supporting wheels carried by said shaft, a pair of runners arranged to slide flat upon the ground, brackets connecting said runners with said cross shaft, a plurality of chains extending between said runners and adapted to drag upon the grass when the apparatus is propelled over the green, a handle connected with said cross shaft whereby the apparatus may be so propelled over the green, and adjustable means on said cross shaft adapted to act upon said brackets when the handle is raised above a predetermined height to maintain the runners and chains in contact with the green, said means comprising collars rotatably mounted on said shaft, set screws for securing the same on the shaft in desired position of adjustment, and arms carried by said collars and engageable with said brackets for holding the same in desired angular position corresponding to the adjusted position of the collars.

6. A vehicular drag apparatus for golf greens or the like, comprising a frame, including a cross shaft, supporting wheels carried by said shaft, a pair of runners, brackets extending between said frame and said runners and providing a pivotal connection therebetween, with said runners arranged to slide flat upon the ground, one or more flexible members having non-scarifying bottom surfaces and extending between said runners and adapted to drag upon the grass when the apparatus is propelled over the green, and a manually manipulatable handle connected with the frame and movable up and down relative to said runners without disturbing the flat position of the latter whereby the apparatus may be so propelled over the green.

References Cited in the file of this patent

UNITED STATES PATENTS

| | | |
|---|---|---|
| 1,158,803 | Gullickson | Nov. 2, 1915 |
| 1,212,563 | Rowe | Jan. 16, 1917 |

FOREIGN PATENTS

| | | |
|---|---|---|
| 42,849 | Netherlands | Mar. 15, 1938 |
| 412,000 | Italy | Sept. 4, 1945 |